(12) United States Patent
Senescu et al.

(10) Patent No.: US 10,757,789 B2
(45) Date of Patent: Aug. 25, 2020

(54) SYSTEM AND METHOD TO GROUP LIGHT SENSORS FOR CONTROLLING ILLUMINATION UNIFORMLY BASED ON AMBIENT LIGHT

(71) Applicant: enLighted, Inc., Sunnyvale, CA (US)

(72) Inventors: Reid Senescu, Portola Valley, CA (US); Tanuj Mohan, Mountain View, CA (US); Norman Farquhar, San Jose, CA (US); Jason Kurashige, San Mateo, CA (US); Sreedhar Kamishetti, Sunnyvale, CA (US)

(73) Assignee: Enlighted, Inc., Sunnyvale, CA (US)

( * ) Notice: Subject to any disclaimer, the term of this patent is extended or adjusted under 35 U.S.C. 154(b) by 0 days.

(21) Appl. No.: 16/137,777

(22) Filed: Sep. 21, 2018

(65) Prior Publication Data

US 2020/0100342 A1 Mar. 26, 2020

(51) Int. Cl.
| | |
|---|---|
| H05B 45/10 | (2020.01) |
| H05B 45/12 | (2020.01) |
| H05B 47/155 | (2020.01) |
| H05B 47/165 | (2020.01) |
| H05B 47/11 | (2020.01) |
| H05B 47/175 | (2020.01) |
| H05B 47/105 | (2020.01) |

(52) U.S. Cl.
CPC .......... *H05B 47/11* (2020.01); *H05B 47/175* (2020.01); *H05B 47/105* (2020.01)

(58) Field of Classification Search
CPC ............ H05B 37/0245; H05B 37/0218; H05B 37/0227; H05B 37/02; G05B 15/02; Y02B 20/46; G01S 5/0009; G01S 5/0018; G01S 5/0027; G01S 5/0045
See application file for complete search history.

(56) References Cited

U.S. PATENT DOCUMENTS

| | | | |
|---|---|---|---|
| 8,587,219 B2 | 11/2013 | Mohan et al. | |
| 8,994,295 B2 | 3/2015 | Mohan et al. | |
| 9,002,522 B2 | 4/2015 | Mohan et al. | |
| 9,006,996 B2 | 4/2015 | Mohan et al. | |
| 9,618,915 B2 | 4/2017 | Mohan et al. | |
| 9,648,697 B1* | 5/2017 | Hick | H05B 47/16 |
| 9,927,782 B2 | 3/2018 | Mohan et al. | |
| 2012/0112667 A1 | 5/2012 | Mohan et al. | |
| 2012/0299485 A1* | 11/2012 | Mohan | H05B 37/0218 315/153 |
| 2016/0245688 A1* | 8/2016 | Verbeek | G01J 1/06 |
| 2016/0360594 A1 | 12/2016 | Chemel | |
| 2018/0167547 A1* | 6/2018 | Casey | G06T 7/246 |

FOREIGN PATENT DOCUMENTS

WO 2014/018234 A1 1/2014

OTHER PUBLICATIONS

PCT Search Report dated Dec. 10, 2019, for PCT Application No. PCT/US2019/052448, 11 pages.

* cited by examiner

*Primary Examiner* — Henry Luong

(57) ABSTRACT

There is described a building automation system for controlling illumination uniformly based on ambient light. Light sensors are distributed within an environment and detect ambient light levels of the environment. An energy manager receives the ambient light levels from the light sensors and determines a group light level based on the ambient light levels. Light sources are distributed within the environment and provide illumination uniformly based on the group light level.

14 Claims, 11 Drawing Sheets

SYSTEM AND METHOD TO GROUP LIGHT SENSORS FOR CONTROLLING ILLUMINATION UNIFORMLY BASED ON AMBIENT LIGHT

FIELD OF THE INVENTION

This application generally relates to the field of building automation systems and, more particularly, systems and methods for controlling illumination for a building automation system in view of available ambient light.

BACKGROUND

Building automation systems provide the capability of managing building management components from a central interface or location. These building management components include various equipment for controlling lighting, power, heating, ventilation, air conditioning, fire safety, and security. The building automation systems provide operational and sustainability benefits to building developers, managers, and occupants. Systems may be optimized for occupant comfort and energy efficiency.

Customer requests and government regulations often specify that lighting fixtures dim to save energy when ambient light from the sun or other fixtures provide supplemental ambient lighting. Some control strategies use a single light sensor to dim an entire group of fixtures. However, a single light sensor does not reliably represent ambient readings across an entire indoor or outdoor space, resulting in light levels from light fixtures that are either too dim or too bright for occupants. Other control strategies use a light sensor at each light fixture to dim the fixtures individually. Although energy consumption and occupant comfort may be controlled for each individual fixture, consumption and comfort are not well managed for the general area illuminated by the group of light fixtures.

Designers of enclosed or partially-enclosed environments, such as business offices, desire lighting techniques that optimize for aesthetics as well as occupant comfort and energy efficiency. Lighting that is aesthetically pleasing for such environments is particularly challenging when ambient lighting includes supplemental daylight, such as sunlight entering through a window. For example, undesirable patterns of light and shade on the walls and ceilings may exist for individually managed fixtures. Also, if the lighting spread over a wide area, such as a spotlight pointed at the ceiling of a dome, existing approaches do not allow for adjustments to the light level in view of ambient light levels spread over this same area. Conventional lighting systems have limited capabilities and intelligence and, thus, do not provide optimal, aesthetically pleasing illumination for a managed area.

SUMMARY

As described herein, a building automation system and method is provided for grouping fixtures into daylight groups that respond uniformly to ambient levels. In particular, uniform illumination is achieved by three general stages: report ambient levels, determine group light level, and act in response to the group light level. As described in further detail herein, each lighting device implemented in accordance with the present invention may be identified to be within a group of lighting devices and configured to report only with respect to detected ambient light levels within an environment, act only with respect to controlling a light source in accordance with a group light level, or report and act. During the reporting phase, reporting sensors transmit their ambient levels to an energy manager. The energy manager determines a group light level using a select lighting mode based on the type of lighting desired. After the daylight group light level is determined, the light level is transmitted to all sensors in the group and the sensors are configured to gradually ramp-up or down to the light level. Safeguards are in place to ensure reliability and life safety in the event of poor communication, and process controls are implemented to maximize stable behavior and minimize noticeable shifts in light levels.

One aspect is a building automation system for controlling illumination uniformly based on ambient light. The system comprises multiple light sensor and multiple light sources distributed within an environment as well as an energy manager receiving a communication from the light sensors and transmitting a communication to a lighting device that controls the light sources. The lighting device that controls the light source may be an acting device or a reporting and acting device as described herein. The light sensors, which may be employed in a lighting device configured as a reporting device or a reporting and acting device, detect ambient light levels of the environment, and the light sources provide illumination to the environment. The energy manager receives the ambient light levels from the light sensors and determines a group light level based on the ambient light levels. Each of the light sources receive the group light level from the energy manager via the lighting device that controls or acts on the respective light source to cause the light sources to collective provide illumination uniformly based on the group light level.

Another aspect is a method of a building automation system for controlling illumination uniformly based on ambient light. Ambient light levels are detected at multiple light sensors. A group light level is then determined at an energy manager based on the multiple detected ambient light levels. Thereafter, illumination is adjusted uniformly at multiple light sources based on the group light level.

Yet another aspect is a non-transitory computer readable medium including executable instructions which, when executed, causes at least one processor to control illumination uniformly for a building automation system based on ambient light. The processor controls illumination uniformly by detecting multiple ambient light levels, determining a group light level based on the multiple detected ambient light levels, and adjusting illumination uniformly based on the group light level.

DETAILED DESCRIPTION

To facilitate an understanding of embodiments, principles, and features of the present invention, they are explained hereinafter with reference to implementation in illustrative embodiments. In particular, they are described in the context of a building automation system and method for controlling illumination uniformly. Embodiments of the present invention, however, are not limited to use in the described devices or methods.

The components and materials described hereinafter as making up the various embodiments are intended to be illustrative and not restrictive. Many suitable components and materials that would perform the same or a similar function as the materials described herein are intended to be embraced within the scope of embodiments of the present invention.

Figure 1:
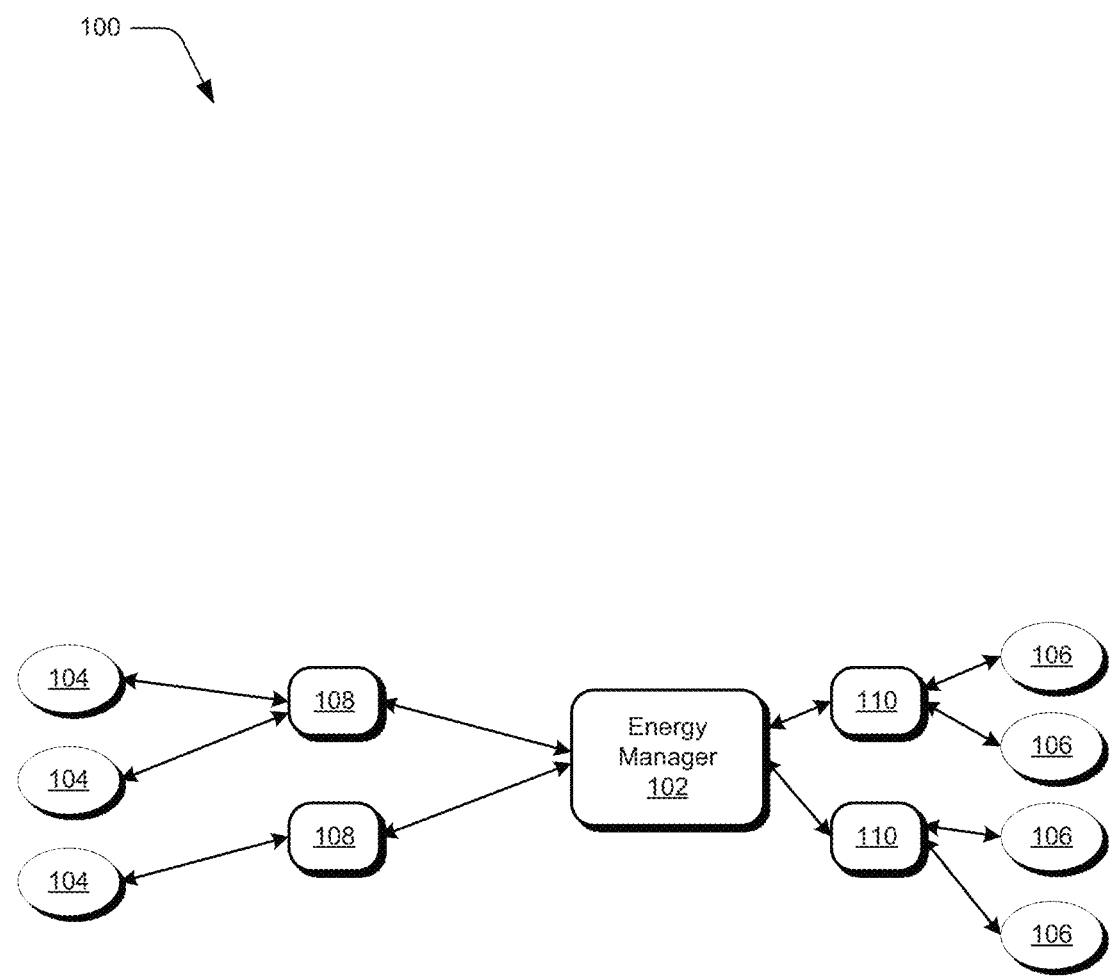
FIG. 1 is a schematic view illustrating a building automation system for controlling illumination in accordance with the present invention.

FIG. 1 illustrates a building automation system 100 for controlling illumination for a determined environment. The building automation system 100 comprises an energy manager 102, multiple light sensors 104 communicating with the energy manager, and multiple light sources 106 communicating with the energy manager. The environment may be any interior or associated exterior area of a building or structure where illumination is managed for aesthetics and ambient light from the sun or other fixtures provides supplemental ambient lighting. For example, the environment may be a small area of a building near an exterior window configured with two or more lights sensors 104 and two or more light sources 106, or the environment may be an entire associated interior and/or exterior area of the building exposed to daylight by windows or a skylight. For some embodiments, the energy manager 102 may be a computing device, such as a server, that is located remote from the environment and communicates with the light sensors 104 and the light sources 106 by a wired link, wireless link, or a combination of wired and wireless links. For example, the energy manager 102 may be located within the same building as the light sensors 104 and the light sources 106 but outside of the environment, or the energy manager may be located outside of the building and environment, so long as communications exists between the energy manager and the light sensors as well as the energy manager and the light sources. For other embodiments, the energy manager 102 may be a computing device that is located within the environment, such as a local server or combined with one or more of the light sensors 104 and/or light sources 106.

A light source 106 may be any type of structure, fixture, or component that has at least one lighting element that may be controlled to provide illumination in the environment. Thus, the light source 106 may be a conduit for controlling a light fixture as well as, or in lieu of, the light fixture. A light source 106 may include, but is not limited to, one or more of the following example components: wiring, wireless communication component, power manager, drive electronics, fixture housing, bulbs/LEDs, and the like. As further explained herein, each lighting device 700 may have a light source interface 722 to control a light source consistent with embodiments described herein.

The building automation system 100 may also comprise one or more first gateways 108 for communication between the energy manager 102 and the light sensors 104 as well as, or in the alternative, one or more second gateways 110 for communication between the energy manager and the light sources 106. The first and second gateways 108, 110 may be combined in a single gateway or exist as separate gateways. Each gateway 108, 110 enables traffic to flow between the energy manager 102 and the other devices 104, 106. For example, each first gateway 108 may facilitate management of a group of light sensors 104 for the energy manager 102, and each second gateway 110 may facilitate management of a group of light sources 106 for the energy manager. The first and second gateways may be located in proximity to the environment of the lights sensors 104 and the light sources 106, in proximity to the energy manager 102, or somewhere there between.

Figure 7:
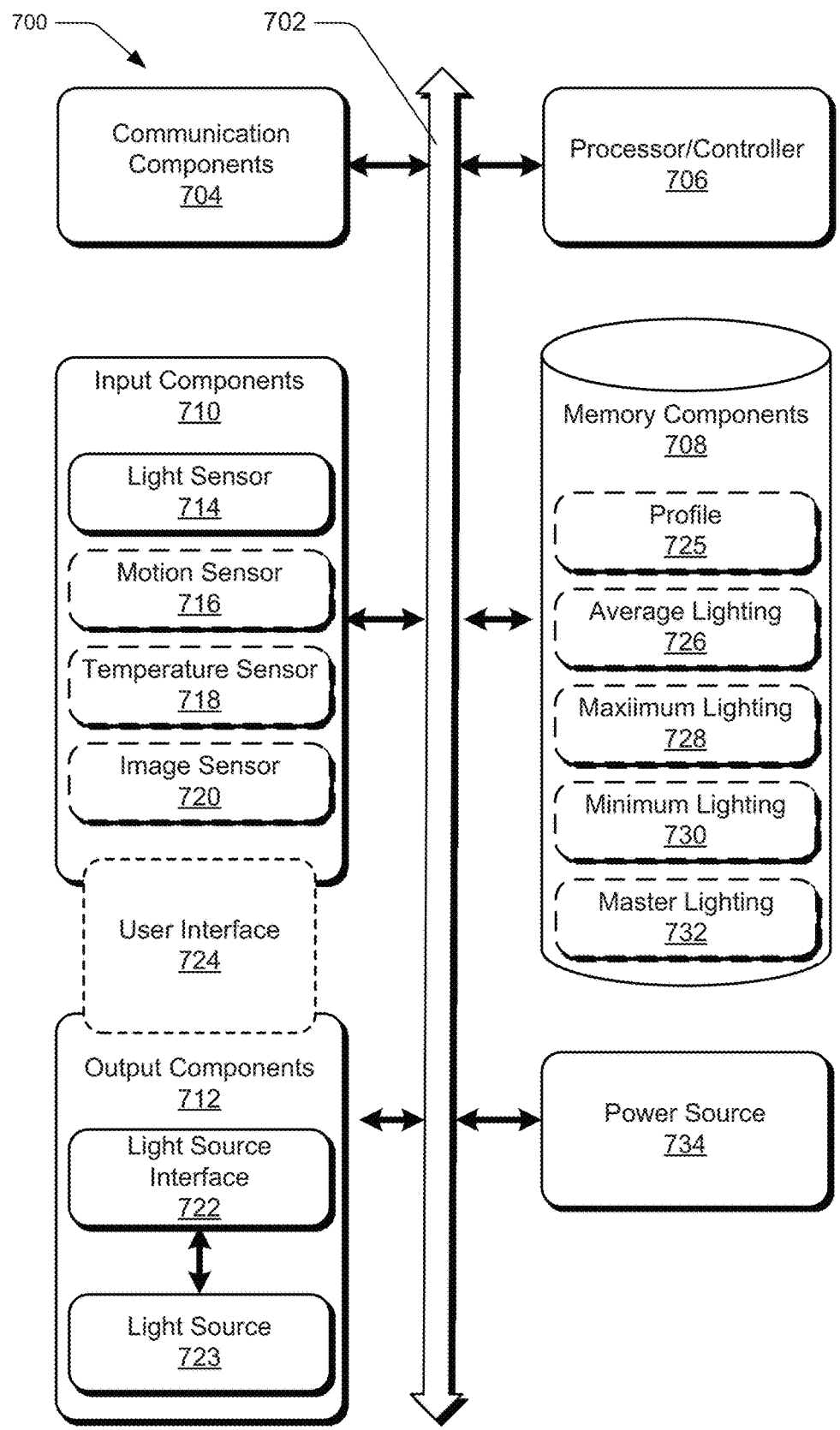
FIG. 7 is a block diagram illustrating example components of a lighting device in accordance with example embodiments of the present invention.

The lighting devices of the building automation system 100 may be categorized as report only devices (reporting devices), act only devices (acting devices), and report and act devices (reporting and acting devices). In one embodiment, each lighting device has a profile stored in memory of the respective lighting device when manufactured or upon receipt from the energy manager 102, where the lighting device configures its lighting behavior to correspond to a report only device, an act only device, or a report and act device based on its stored profile. The profile of a respective lighting device may also include an assigned group identifier that identifies which daylight group the respective lighting device is associated. In such an embodiment, each lighting device is responsive to messages from the energy manager that include the group identifier assigned to the respective lighting device. The profile for the respective lighting device may also include a daylight harvesting target light level that is used by the respective lighting device (when configured to be a report only device or a report and acting device) to control a respective light source when not commanded to use a group lighting level or in conjunction with the group lighting level received from the energy manager. The daylight harvesting target light level for a respective lighting device may be set based on the location of the lighting device with respect to a window or other area where daylight ambient light may be sensed by a light sensor of the lighting device. The report only devices are set to sense ambient light levels, so the light sensor 104 is an example of a report only device. The act only devices each interface to and control a light source 106 to generate light. The report and act devices include a light sensor 104 to sense light levels and a light source interface (722 as shown in FIG. 7 and described herein) to connect to and control a light source 106 to generate light. Although the light sensor 104 and the light source 106 may be described separately and distinctly, the light sensor may be integrated within a lighting device that also interfaces to and controls a light source 106. Similarly, the light source interface 722 for controlling a light source 106 may be integrated within a lighting device that also includes a light sensor 104. Moreover, a lighting device consistent with embodiments disclosed herein may also include the light source 106. The report only devices transmit their ambient light levels and their daylight harvesting target light levels to the energy manager 102 for the purpose of determining the group light level by the energy manager. The report only devices report their ambient light levels, but their lighting behavior is based on their respective profile and is not influenced by their presence in the daylight group. The act only devices update their light levels (for controlling a respective light source) in response to the group light level set for the group of lighting devices. The act only devices, also known as respond only devices, respond with the group light level set for the group to control a respective light source, but their detected ambient light levels (if any based on a lighting sensor that may be included in the respective act only device) have no influence on their light levels for controlling their respective light source or the group light levels that are received from the energy manager to control light sources within the group. The report and act devices, also known as report and respond devices, both report their detected ambient light levels and their daylight harvesting target light levels to the energy manager as well as update the light levels for controlling their respective light source in response to the group light level received from the energy manager.

The workflow of the building automation system 100 is generally from the light sensors 104, through the energy manager 102, to the light sources 106, although bilateral communications may exist between the energy manager 102, 800 and all other devices 104, 106, 108, 110, 700 of the building automation system. The light sensors 104 and light sources 106 are distributed within the environment. The light sensors 104 detect ambient light levels of the environment. The detected ambient light levels are ambient light levels measured by each sensor 104. The energy manager 102 communicates with the light sensors 104 and, as part of the communications, the energy manager receives the detected ambient light levels from each of the light sensors in assigned to a group, as well as the daylight harvesting target light level of each of the light sensors. The daylight harvesting target light level, also known as an ambient threshold value, is a goal of the ambient light level that the light sensor attempts to achieve by adjusting its light level for controlling a respective light source. The energy manager 102 then determines a group light level based on the detected ambient light levels and the daylight harvesting target light level received from the light sensors 104 in the assigned daylight group. The group light level, also known as a dim level, is a light output sent from the energy manager 102 to the lighting devices in the corresponding daylight group after the energy manager 102 considers the detected ambient light levels and daylight harvesting target levels of the lighting devices assigned to the respective daylight group. Next, the energy manager 102 communicates with the lighting devices configured as act only devices or report and acting devices and, as part of the communications, the light sources 106 receive the dim level from the energy manager via the respective lighting device. Thereafter, the light sources 106 provide illumination uniformly based on the dim level.

Figure 2:
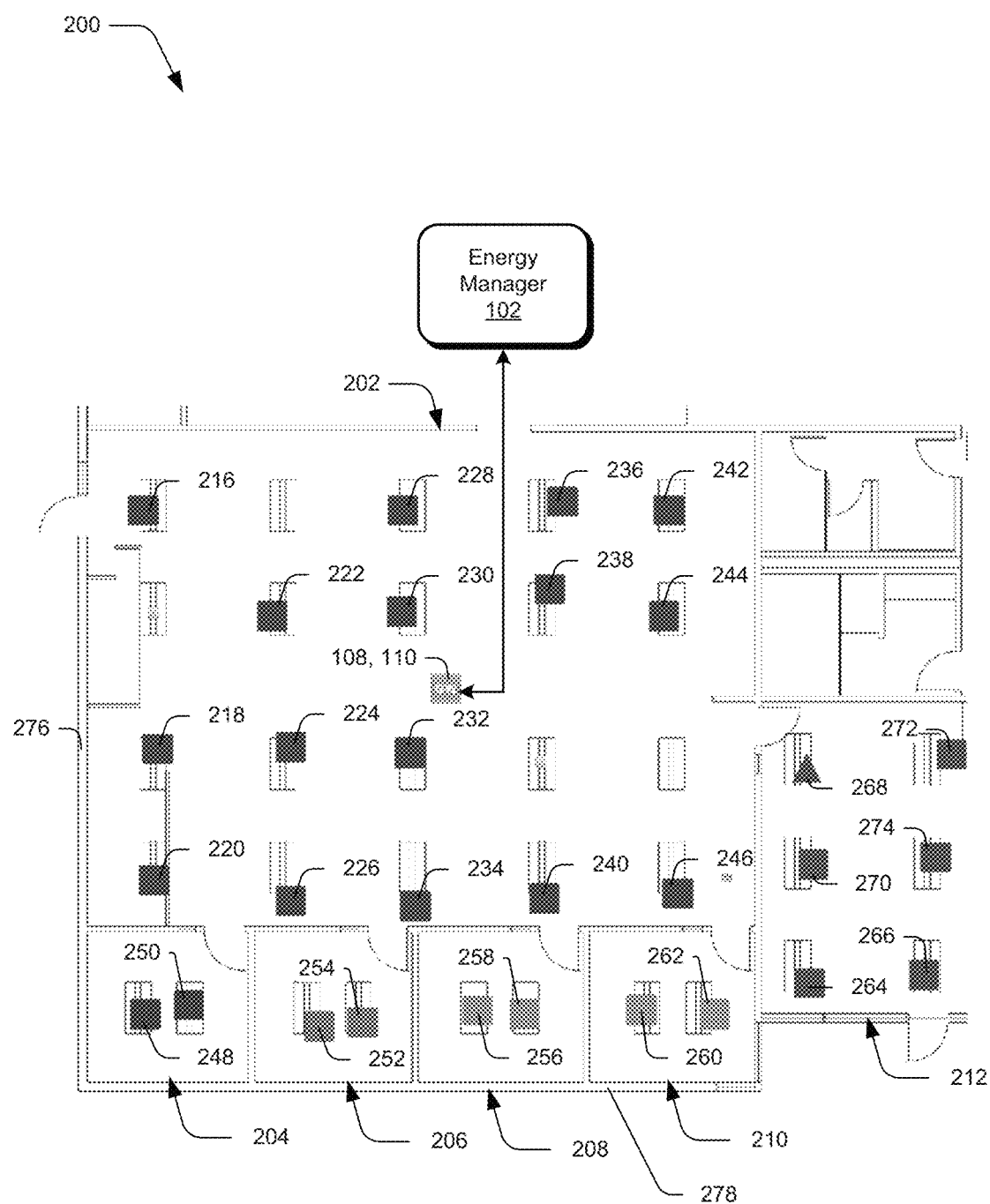
FIG. 2 is a schematic view illustrating an example setup of various devices of the building automation system in accordance with the present invention.

FIG. 2 illustrates an example floor plan 200 of devices of a building automation system located at determined areas of a building. The floor plan 200 illustrates six different environments 202-212 with devices 216-274 located in each environment. A first environment 202 includes sixteen devices 216-246 distributed therein, a second environment 204 includes two devices 248, 250 distributed therein, a third environment 206 includes two devices 252, 254 distributed therein, a fourth environment 208 includes two devices 256, 258 distributed therein, a fifth environment 210 includes two devices 260, 262 distributed therein, and a sixth environment 212 includes six devices 264-274 distributed therein. Each device 216-274 may be a lighting device consistent with the embodiments described herein. Accordingly, each device 216-274 may be a reporting device that includes a light sensor; an acting device that includes a light source or a light source interface for controlling a light source; or a reporting and acting device that includes a light sensor and a light source (or a light source interface for controlling a light source).

Each environment 202-212 includes an area that may be exposed to daylight. For example, each environment 202-212 is bounded by at least one outside wall 276, 278 that leads to an exterior of the building. Thus, a portal at the outside wall 276, 278, such as a window, or at a ceiling, such as a skylight, may allow light from the exterior of the building to enter the environment and impact the lighting conditions of the environment. Also, portals located at an inside wall may allow exterior light, passing through another portal at the outside wall 276, 278, to enter an environment bounded by the inside wall. Any type of daylight that finds its way into an environment may have an impact on illumination and, thus, benefit from the building automation system described herein.

The building automation system 100 controls illumination uniformly throughout a determined environment, particularly for a group of devices associated with the environment. For example, as represented by the floor plan 200 of FIG. 2, each environment 202-212 may be a room bounded by walls. For other embodiments, a room may include multiple environments or an environment may include multiple rooms, depending on the desired aesthetic effect as specified by a system user. Also, the group of devices (and in particular lighting devices) associated with the environment may operate to control the light sources within that environment independently of other environments, or multiple environments may be coordinated for a smooth transition of illumination from one environment to another. Thus, illumination is provided uniformly throughout each environment by the group of devices within the environment as managed by the building automation system 100, and illumination may be coordinated, uniformly or otherwise, for adjacent environments by the building automation system.

As described above, the building automation system 100 may also comprise one or more gateways 108, 110 for communication with the devices 216-274 and the energy manager 102. Each gateway 108, 110 may be located in proximity to a group of devices, particularly where communication between the gateway and one or more devices is via wireless link. For example, as illustrated by FIG. 2, the gateway 108, 110 may be co-located located with to the devices 216-246 within one particular determined environment of the floor plan 200. For those embodiments where a gateway 108, 110 is utilized, the energy manager 102 may communicate with the devices through the gateway. For other embodiments, where a gateway 108, 110 is not utilized, the energy manager 102 may communicate with the devices directly. Similar, to the gateway 108, 110, the location of the energy manager 102 relative to the devices is not restricted so long as wired and/or wireless communications operate properly between them. For example, the energy manager 102 may be co-located with the devices, located at another part of the building remote from the devices, or located outside of the building at a remote location.

Figure 3A:
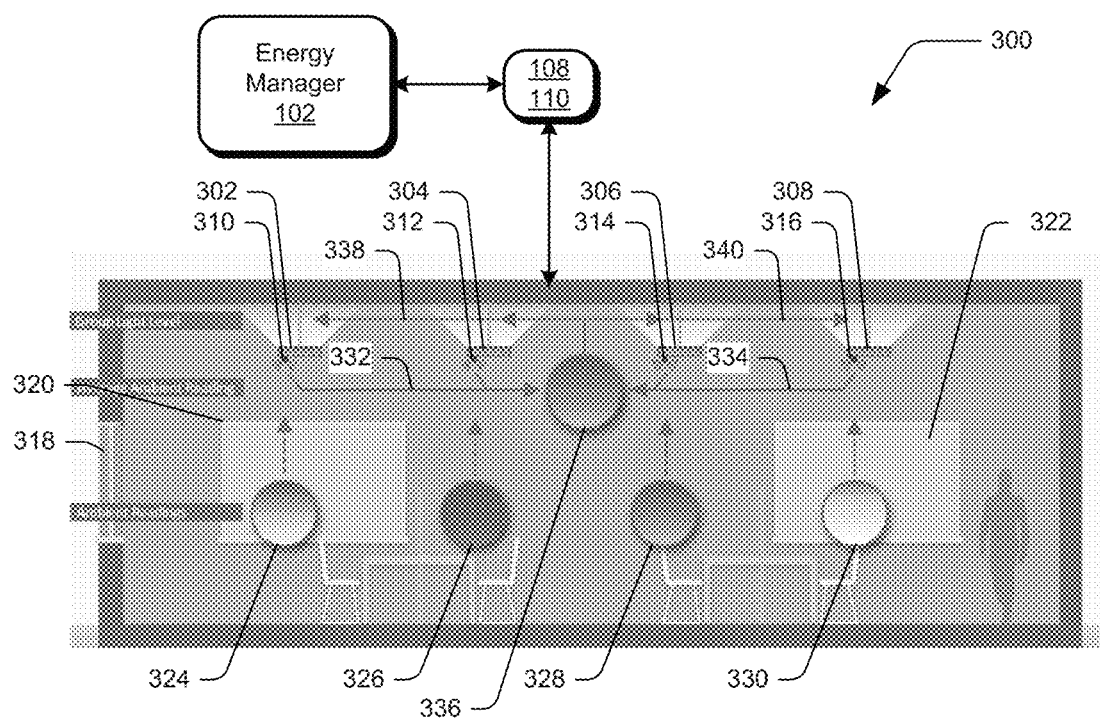
FIGS. 3A and 3B are schematic views illustrating example setups of various devices of the building automation system in which one or more devices are operating in an average lighting mode.

FIG. 3A illustrates an example room environment 300 for the building automation system 100 in which the energy manager 102 operates in an average lighting mode. For the example room environment 300, the energy manager 102 communicates with multiple devices via a gateway 108, 110, in which each device controls or includes a light source 302-308 that provides illumination to a ceiling of the environment and a light sensor 310-316 that detects ambient light levels of the environment. The example room environment 300 also has multiple portals 318, 320, 322, such as windows and skylights, for allowing daylight that may be harvested and leveraged for illuminating the environment. The building automation system 100 supplements the daylight to provide aesthetically pleasing illumination to the environment 300 while providing occupant comfort and/or energy efficiency.

The light sensors 310-316 of the devices are distributed within the environment 300 and detect ambient light levels 324-330 of various areas throughout the environment that may be impacted by daylight allowed at the portals 318-322. For example, some sensors 316 may detect bright light levels 330 based on their close proximity to one or more portals 322, some sensors 312 may detect dim light levels 326 based on their lack of proximity to the portals 318-322, and other sensors 310, 314 may detect light levels 324, 328 somewhere between the bright and dim light levels based on, again, their proximity to the portals.

The detected ambient light levels 324-330 may be transmitted from the light sensors 310-316 via wired or wireless links 332, 334 and provided to the gateway 108, 110 which, in turn, forwards the ambient light levels to the energy manager 102. The energy manager 102 receives the ambient light levels 324-330 from the light sensors 310-316 and determines a group light level based on the detected ambient light levels. The energy manager 102 transmits the group light level to the gateway 108, 110 which, in turn, forwards the group light level to the devices that control or include the light sources 302-308 via wired or wireless links 338, 340. The light sources 302-308 receive the group light level from the energy manager 102 and provide illumination uniformly based on the group light level. As described in further detail herein, a light source may receive the group light level from the energy manager 102 via the respective lighting device that controls or includes the respective light source.

The energy manager 102 operates in the average lighting mode to determine the group light level based on the detected ambient light levels 324-330. The average lighting mode supplements available daylight so that, on average, all occupants have close to the desired level of illumination. Some light levels in the group of lighting devices may be set to be brighter than their individual targets and some light levels may be set to be less bright than their individual targets but, on average, the light levels of each lighting device in the group will meet the group target for the aggregate group light level. The energy manager 102 receives a current ambient level 324-330 for each light sensor 310-316 as well as a daylight harvesting target light level associated with each lighting device in the group for the respective environment. The energy manager 102 determines the difference between the current ambient level and the target light level for each light sensor 310-316 that reports its detected ambient light levels within the respective environment to the energy manager. The energy manager 102 also determines the mean of the differences ("mean difference") as well as the mean of the ambient light levels ("mean ambient light") 336 received from the reporting light sensors 310-316. The energy manager 102 determines the group light level by adding the mean ambient light 336 and the mean difference. As a result, the expected ambient light level for each device will be the sum of the mean difference and the current ambient light level for the device.

The daylight harvesting target light level ("target light level") is a goal of the ambient light level 324-330 that each of the lighting devices in the respective group that includes or controls the light source 302-308 attempts to achieve by adjusting its light level for the light source 302-308. The target light level may be set manually during assembly of the device or light source, at a user interface of the device or light source, or at a remote device networked with the device or light source. For example, the user may enter a target ambient light level (i.e., a threshold value) based on ambient light levels of the lighting devices selected over a recent period of time, so that the user has a reference on which to base the manual value. Specific information about the ambient light levels may include, but are not limited to, date, time, number of light sensors reported readings, and statistics such as average, maximum, & minimum. The target light level may be set automatically by calibration. For example, the lighting devices may have different target values, but a single target value may be determined for the group depending on the lighting mode selected for the determination.

Figure 3B:
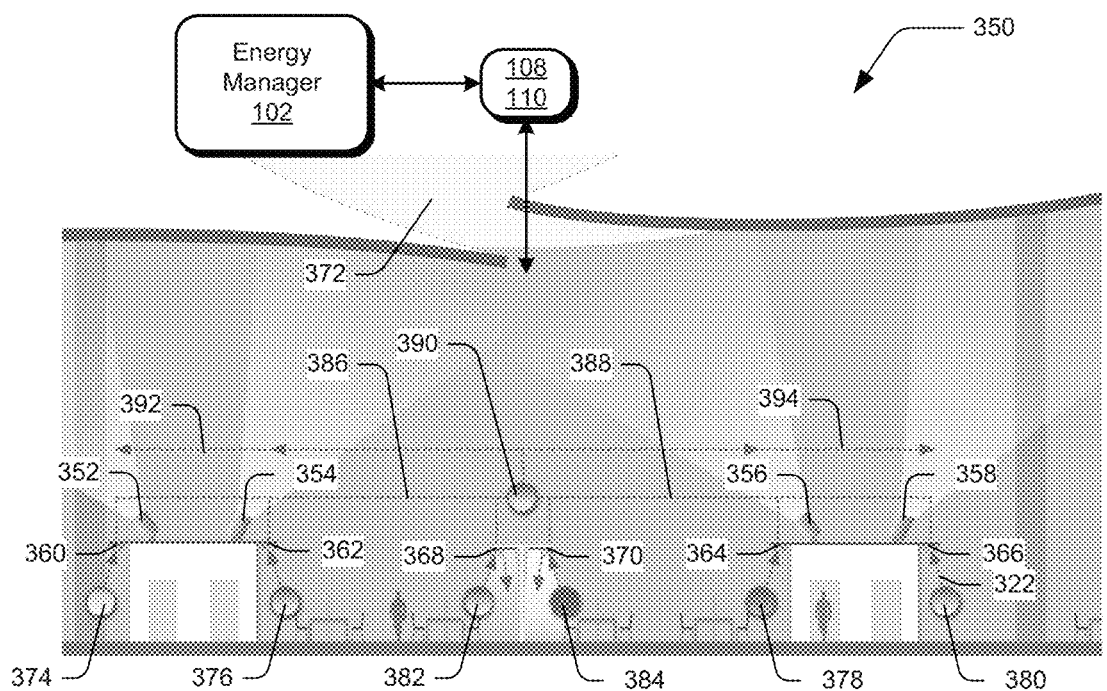

FIG. 3B illustrates an example atrium or high-ceiling environment 350 for the building automation system 100 in which the energy manager 102 operates in an average lighting mode. The example high-ceiling environment 350 of FIG. 3B is similar to the example room environment 300 of FIG. 3A. For example, the energy manager 102 communicates with multiple devices via a gateway 108, 110. On the other hand, the devices of the high-ceiling environment 350 are different from the devices of the room environment 300. For the high-ceiling environment 350 represented by FIG. 3B, it may be more appropriate to utilize reporting only devices and act only devices in contrast to the use of report and act devices for the room environment 300 represented by FIG. 3A. Thus, the energy manager 102 may communicate with acting devices that control or include light sources 352-358 and reporting devices that include light sensors 360-370. Also, the example high-ceiling environment 300 may have one or more portals 372 at a ceiling, such as a skylight, for allowing daylight that may be harvested and leveraged.

Various environments may include any combination of reporting devices, acting devices, and reporting and acting devices. For the example high-ceiling environment 350, the light sources 352-358 and the light sensors 360-370 of the devices are distributed within the environment 300, but the light sources and the light sensors are positioned separately from each other. The structure of a high-ceiling room may require an approach for placement and angular positioning of devices that is different from an approach for other types of rooms. In particular, the light sources 352-358 may be positioned for optimal illumination for the high-ceiling of the example environment 350 by directing some light sources 352, 358 toward a proximal wall instead of the ceiling. Also, the light sensors 360-370 may be positioned for optimal detection of ambient light levels 374-384 by positioning them on internal structures other than the ceiling. It should be noted that, while some light sensors 374, 376, 378, 380 are located near light sources 352, 354, 356, 358, other light sensors 382, 384 are located separate and remote from the light sources. Thus, the quantities of light sensors and light sources within an environment may differ, and they may be positioned together or separately depending upon the desired effect for illuminating the environment.

The general operation of the example high-ceiling environment 350 of FIG. 3B is similar to operation of the example room environment 300 of FIG. 3A. The ambient light levels 374-384 may be detected by light sensors 360-370, transmitted from the light sensors 360-370 via wired or wireless links 386, 388 and provided to the gateway 108, 110 which, in turn, forwards the ambient light levels to the energy manager 102. The energy manager 102 receives the detected ambient light levels 374-384 from the light sensors 360-370 and operates in the average lighting mode, as described above for FIG. 3A, to determine a group light level based on the ambient light levels 374-384, taking into consideration the mean ambient light 390. The energy manager 102 transmits the group light level to the gateway 108, 110 which, in turn, forwards the group light level to the lighting devices that control or include the light sources 352-358 via wired or wireless links 392, 394. The light sources 352-358 receive the group light level from the energy manager 102 and provide illumination uniformly based on the group light level. As described in further detail herein, a light source may receive the group light level from the energy manager 102 via the respective lighting device that controls or includes the respective light source.

Figure 4A:
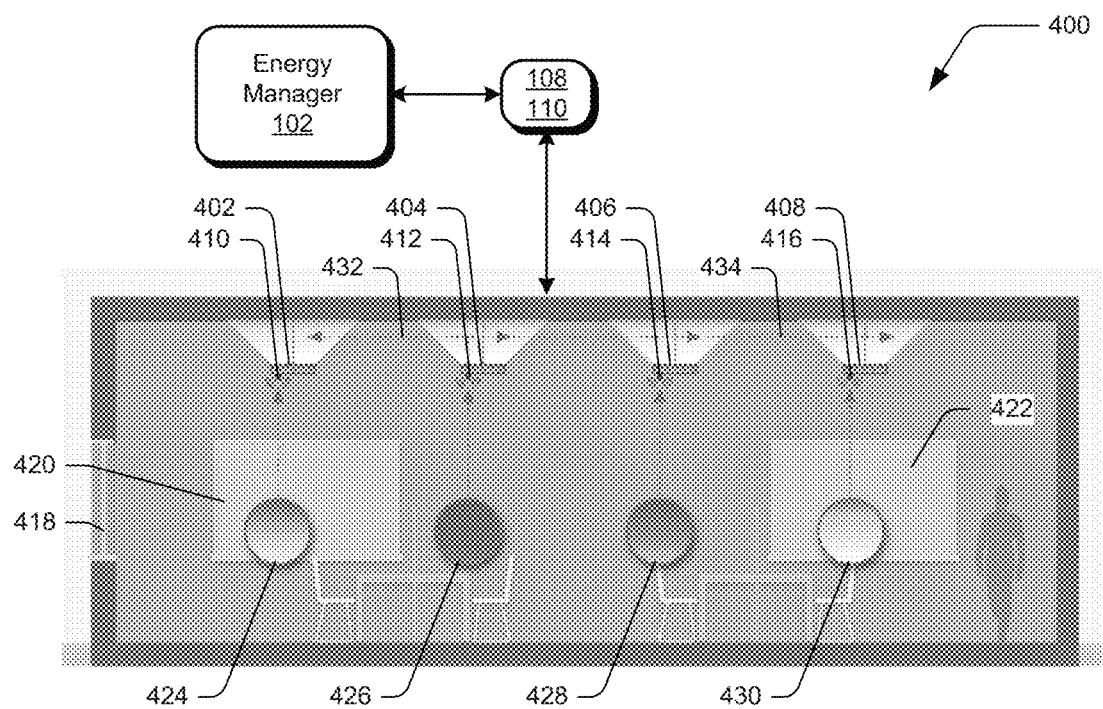
FIGS. 4A and 4B are schematic views illustrating more example setups of various devices of the building automation system in which one or more devices are operating in a minimum lighting mode.

FIG. 4A illustrates an example room environment 400 for the building automation system 100, similar to the environment 300 of FIG. 3A except that the energy manager 102 operates in a minimum lighting mode. The energy manager 102 communicates with multiple devices via a gateway 108, 110, in which each device controls or includes a light source 402-408 and a light sensor 410-416. Multiple portals 418, 420, 422 allow for daylight in the environment 400. The light sensors 410-416 of the devices detect ambient light levels 424-430 and provide them by way of the wired or wireless links 432, 434 to the energy manager 102, directly or via the gateway 108, 110. The energy manager 102 receives the ambient light levels 424-430 from the light sensors 410-416 and determines a group light level based on the ambient light levels. The energy manager 102 transmits the group light level to the light sources 302-308, directly or via the gateway 108, 110, by way of the wired or wireless links 432, 434. The light sources 402-408 receive the group light level from the energy manager 102 and provide illumination uniformly based on the group light level consistent with the embodiments described herein.

The energy manager 102 operates in the minimum lighting mode to determine the group light level based on the ambient light levels 424-430. The minimum lighting mode supplements available daylight so that the darkest ambient light level governs the group light level and no occupant has insufficient lighting. In particular, the group light level is set to promote all light level targets to be met or exceeded. All devices are set to a maximum light level required to meet the targets of all devices. If all devices have the same target, then the device with the minimum daylight will be the device that governs, so no occupant will have insufficient lighting.

To determine the group light level in the minimum lighting mode, the energy manager 102 receives a current ambient light level 424-430 for each light sensor 410-416 as well as a daylight harvesting target light level associated with each light sensor. The energy manager 102 determines the difference between the current ambient level and the target light level for each light sensor 410-416 that reports ambient light. The energy manager 102 also identifies the maximum difference of all determined differences of the light sensors 410-416 as well as the minimum ambient light of all ambient light levels received from the reporting light sensors. For example, in FIG. 4A, the second light sensor 412 from the left provides the darkest ambient light level 426, so the energy manager 102 identifies that particular ambient light level 426 to be the minimum ambient light. The energy manager 102 determines the group light level by adding the minimum ambient light and the maximum difference. As a result, the expected ambient level for each device will be the sum of the maximum difference and the current ambient level for the device.

Figure 4B:
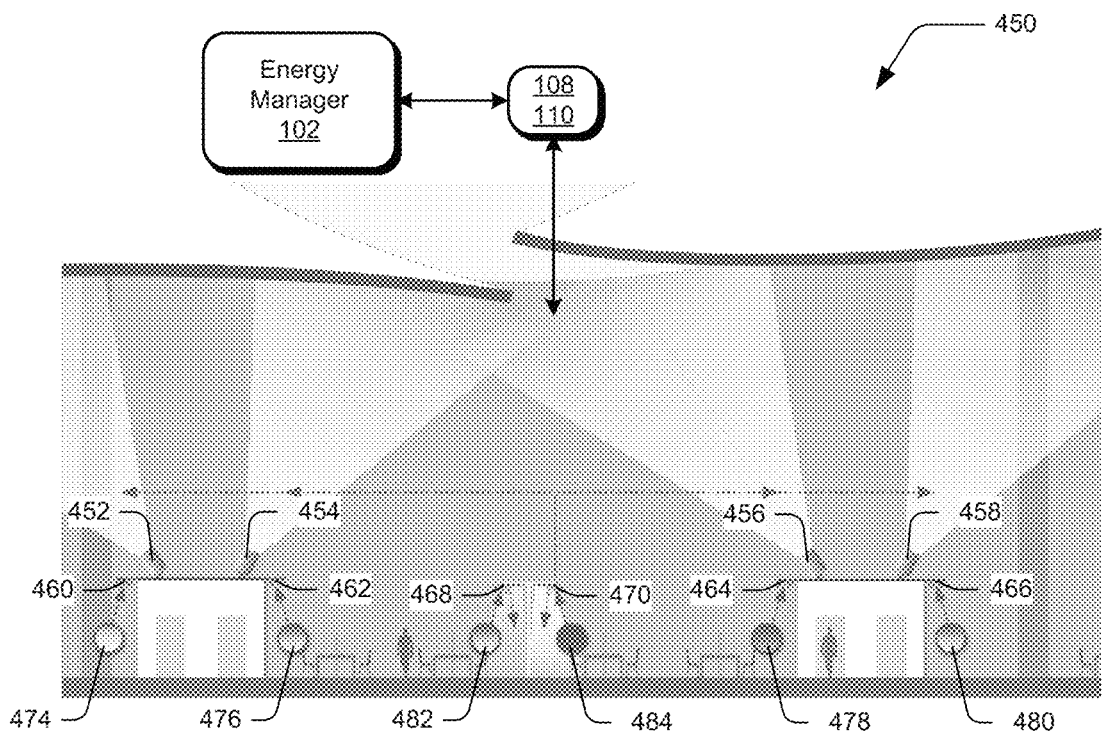

FIG. 4B illustrates an example high-ceiling environment 450 for the building automation system 100 in which the energy manager 102 operates in a minimum lighting mode. The example high-ceiling environment 450 of FIG. 4B is similar to the example room environment 400 of FIG. 4A, except that the light sources 452-458 and the light sensors 460-470 are positioned separately from each other, similar to the example high-ceiling environment 350 of FIG. 3B. Thus, the energy manager 102 receives the detected ambient light levels 474-484 from the light sensors 460-470, directly or via the gateway 108, 110, and operates in the minimum lighting mode, as described above for FIG. 4A, to determine the group light level based on the ambient light levels. For example, the third light sensor 470 from the right provides the darkest ambient light level 484, so the energy manager 102 identifies that particular ambient light level 484 to be the minimum ambient light. The energy manager 102 transmits the group light level to the devices that control or include the light sources 452-458, directly or via the gateway 108, 110. The quantities of light sensors and light sources within an environment may differ, and they may be positioned together or separately depending upon the desired effect for illuminating the environment.

Figure 5A:
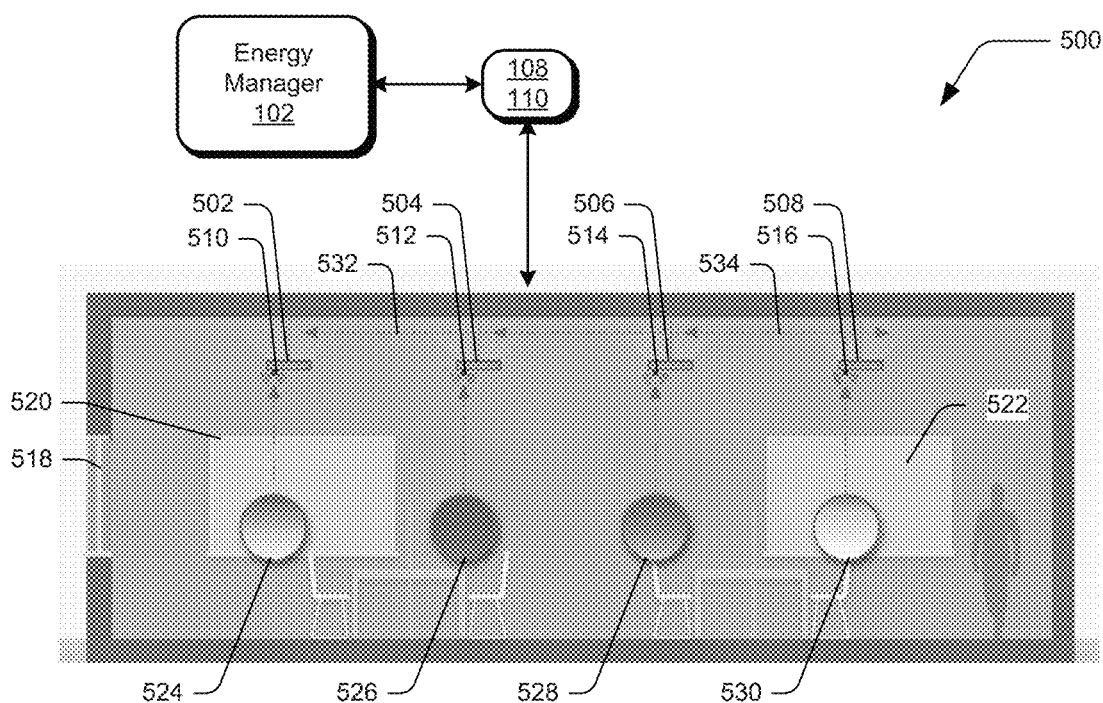
FIGS. 5A and 5B are schematic views illustrating still more example setups of various devices of the building automation system in which one or more devices are operating in a maximum lighting mode.

FIG. 5A illustrates an example room environment 500 for the building automation system 100, similar to the environments 300, 400 of FIGS. 3A and 4A except that the energy manager 102 operates in a maximum lighting mode. The energy manager 102 communicates with multiple devices via a gateway 108, 110, in which each device includes a light source 502-508 and controls or includes a light sensor 510-516. Multiple portals 518, 520, 522 allow for daylight in the environment 500. The light sensors 510-516 of the devices detect ambient light levels 524-530 and provide them by way of the wired or wireless links 532, 534 to the energy manager 102, directly or via the gateway 108, 110. The energy manager 102 receives the detected ambient light levels 524-530 from the light sensors 510-516 and determines a group light level based on the ambient light levels. The energy manager 102 transmits the group light level to the devices that control or include the light sources 502-508, directly or via the gateway 108, 110, by way of the wired or wireless links 532, 534. The light sources 502-508 receive the group light level from the energy manager 102 and provide illumination uniformly based on the group light level consistent with the embodiments described herein.

The energy manager 102 operates in the maximum lighting mode to determine the group light level based on the ambient light levels 524-530. The maximum lighting mode supplements available daylight so that the brightest ambient light level governs the group light level and no occupant has excessive lighting. In particular, the group light levels are optimized for reduced energy usage or maximized occupant flexibility. All devices are set to a minimum light level required to meet a target of at least one device. If all devices have the same target, then the device with the maximum daylight will be the device that governs. The maximum daylight setting is also helpful when users have task lighting, since it is easier for occupants with task lighting to add light rather than remove light. For the maximum lighting mode, no occupants will have too much lighting.

To determine the group light level in the maximum lighting mode, the energy manager 102 receives a current ambient level 524-530 for each light sensor 510-516 as well as a daylight harvesting target light level associated with each light sensor. The energy manager 102 determines the difference between the current ambient level and the target light level for each light sensor 510-516 that reports ambient light. The energy manager 102 also identifies the minimum difference of all determined differences of the light sensors 510-516 as well as the maximum ambient light of all ambient light levels received from the reporting light sensors. For example, in FIG. 5A, the light sensor 516 at the farthest right provides the brightest ambient light level 530, so the energy manager 102 identifies that particular ambient light level 530 to be the maximum ambient light. The energy manager 102 determines the group light level by adding the maximum ambient light and the minimum difference. As a result, the expected ambient level for each device will be the sum of the minimum difference and the current ambient level for the device.

Figure 5B:
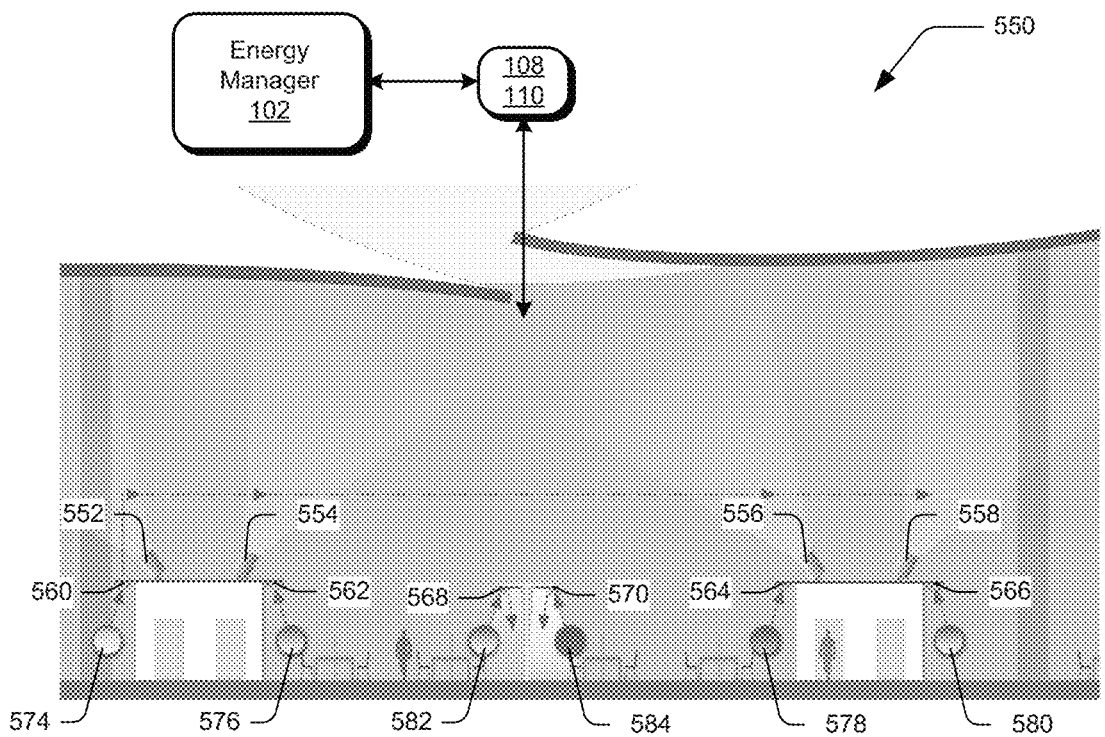

FIG. 5B illustrates an example high-ceiling environment 550 for the building automation system 100 in which the energy manager 102 operates in a maximum lighting mode. The example high-ceiling environment 550 of FIG. 5B is similar to the example room environment 500 of FIG. 5A, except that the light sources 552-558 and the light sensors 560-570 are positioned separately from each other, similar to the example high-ceiling environments 350, 450 of FIGS. 3B and 4B. Thus, the energy manager 102 receives the ambient light levels 574-584 from the light sensors 560-570, directly or via the gateway 108, 110, and operates in the maximum lighting mode, as described above for FIG. 5A, to determine the group light level based on the ambient light levels. For example, the light sensor 560 at the farthest left provides the brightest ambient light level 574, so the energy manager 102 identifies that particular ambient light level 574 to be the maximum ambient light. The energy manager 102 transmits the group light level to the devices that control or include the light sources 552-558, directly or via the gateway 108, 110. The quantities of light sensors and light sources within an environment may differ, and they may be positioned together or separately depending upon the desired effect for illuminating the environment.

Figure 6A:
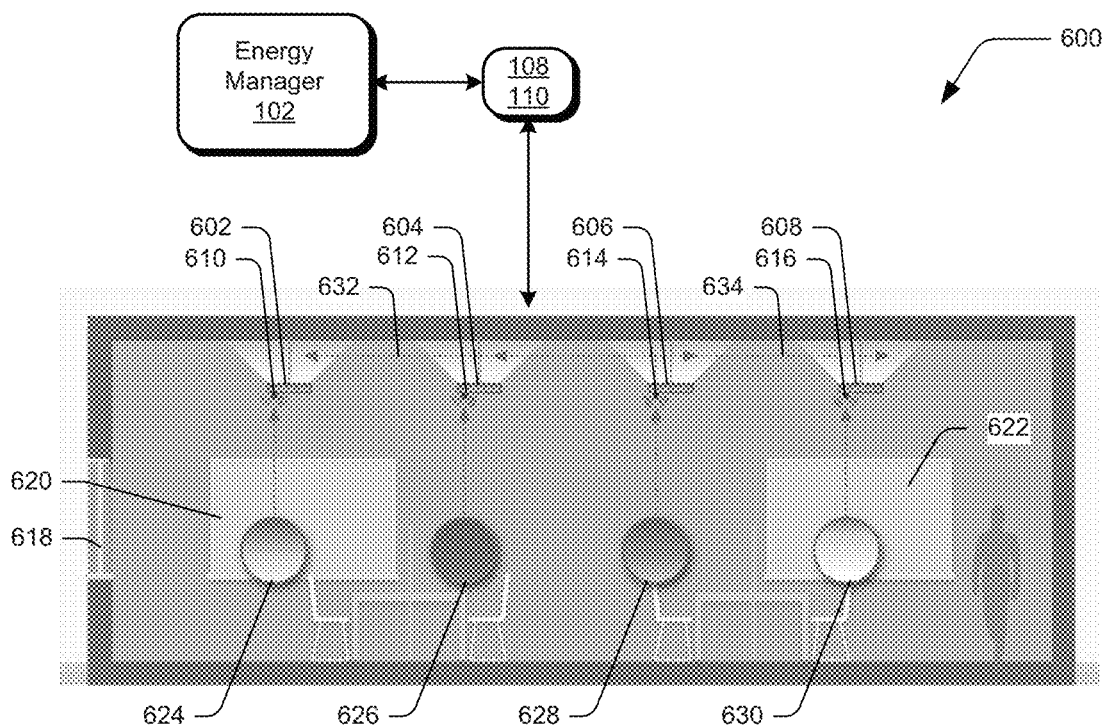
FIGS. 6A and 6B are schematic views illustrating further example setups of various devices of the building automation system in which one or more devices are operating in a master lighting mode.

FIG. 6A illustrates an example room environment 600 for the building automation system 100, similar to the environments 300, 400, 500 of FIGS. 3A, 4A, and 5A except that the energy manager 102 operates in a master lighting mode. The energy manager 102 communicates with multiple devices via a gateway 108, 110, in which each device controls or includes a light source 602-608 and includes a light sensor 610-616. Multiple portals 618, 620, 622 allow for daylight in the environment 600. The light sensors 610-616 of the devices detect ambient light levels 624-630 and provide them by way of the wired or wireless links 632, 634 to the energy manager 102, directly or via the gateway 108, 110. The energy manager 102 receives the ambient light levels 624-630 from the light sensors 510-516 and determines a group light level based on the ambient light levels. The energy manager 102 transmits the group light level to the devices that control or include the light sources 602-608, directly or via the gateway 108, 110, by way of the wired or wireless links 632, 634. The light sources 602-608 receive the group light level from the energy manager 102 and provide illumination uniformly based on the group light level consistent with the embodiments of the lighting devices described herein.

The energy manager 102 operates in the master lighting mode to determine the group light level based on the ambient light levels 624-630. The master lighting mode supplements available daylight so that the ambient light level of the master device governs the group light level. In particular, the group light levels are set to promote the light level at the user-designated master device. For the master lighting mode, the targets and detected ambient light levels of all other devices, i.e., light sensors, of the group are ignored.

To determine the group light level in the master lighting mode, the energy manager 102 receives a current ambient level 624-630 for each light sensor 610-616 as well as a daylight harvesting target light level associated with each light sensor. The energy manager 102 determines the difference between the current ambient level and the target light level for the light sensor of the master device, i.e., master difference. The energy manager 102 also receives the detected ambient light level of the light sensor of the master device, i.e., master ambient light. For example, in FIG. 6A, the second light sensor 614 from the right is associated with the master device, which controls or includes light source 606, so the energy manager 102 may identify the ambient light level 628 of that light sensor 614 to correspond to the master ambient light. The energy manager 102 determines the group light level by adding the master ambient light and the master difference. As a result, the expected ambient level for each device will be the sum of the master difference and the current ambient level for the device.

Figure 6B:
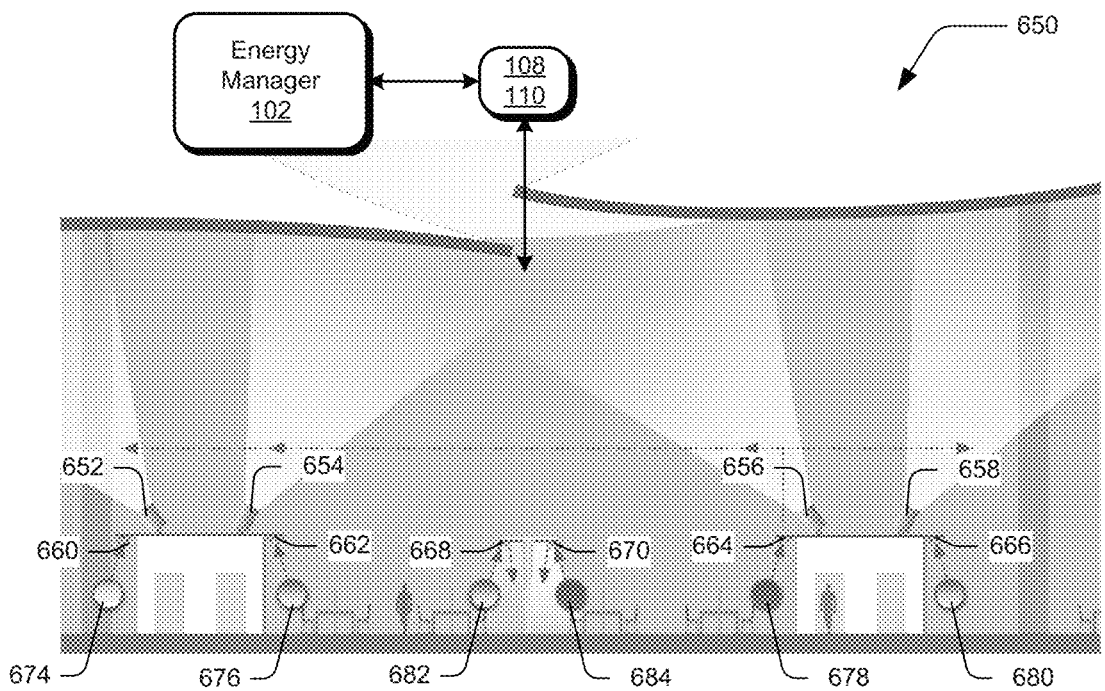

FIG. 6B illustrates an example high-ceiling environment 650 for the building automation system 100 in which the energy manager 102 operates in a master lighting mode. The example high-ceiling environment 650 of FIG. 6B is similar to the example room environment 600 of FIG. 6A, except that the light sources 652-658 and the light sensors 660-670 are positioned separately from each other, similar to the example high-ceiling environments 350, 450, 550 of FIGS. 3B, 4B, and 5B. Thus, the energy manager 102 receives the detected ambient light levels 674-684 from the light sensors 660-670, directly or via the gateway 108, 110, and operates in the master lighting mode, as described above for FIG. 6A, to determine the group light level based on the ambient light levels. For example, the second light sensor 664 from the right may be associated with the master device, so the energy manager 102 may identify the ambient light level 678 of that light sensor 664 to correspond to the master ambient light. The energy manager 102 transmits the group light level to the devices that control or include the light sources 652-658, directly or via the gateway 108, 110. The quantities of light sensors and light sources within an environment may differ, and they may be positioned together or separately depending upon the desired effect for illuminating the environment.

FIG. 7 is a block diagram illustrating example components 700 of a lighting device, such as a reporting device that includes a light sensor, an acting device that includes a light source, and a reporting and acting device that includes a light sensor and a light source. It should be noted that a reporting device may include a light source that is inactive or otherwise not in use and, similarly, an acting device may include a light sensor that is inactive or otherwise not in use.

The device components 700 comprise component interconnections 702 (such as a data bus), a communication component 704, one or more processors or controllers 706, and one or more memory components 708. The communication component 704 of the example device components 700 may utilize wireless technology for communication, such as, but are not limited to, satellite-based and cellular-based communications and their variants as well as wireless local area network (WLAN) communication and their variants, such as infrastructure, peer-to-peer, ad hoc, bridge, and wireless distribution based communications. Examples of WLAN communications include, but are not limited to, IEEE 802.11 (Wi-Fi), IEEE 802.16 (WiMAX), Bluetooth, BLE, and Zig-Bee. Wireless communications may further include other forms of communication such as microwave or infrared technology (IR). The communication component 704 of the example device components 700 may utilize wired technology for communication, in addition to or in the alternative to wireless communications, which may include any type of transmission of data over a physical conduit, such as an electrical cable or optical fiber cable.

The processor 706 may execute code and process data received from other components of the device components 700, such as information received at the communication component 704 or stored at the memory component 708. The code associated with the building automation system 100 and stored by the memory component 708 may include, but is not limited to, operating systems, lighting control applications, device drivers, and the like. The data associated with the building automation system 100 and stored by the memory component 708 may include, but is not limited to, ambient light levels, daylight harvesting target light levels, group light levels, and the like. The memory component 708 may also store a profile 725 for the lighting device comprising the device components 700, where the profile 725 includes a group identifier (corresponding to a daylight group of devices) assigned to the respective device. The profile may also include the daylight harvesting target level for the respective device. Each operating system includes executable code that controls basic functions of each device, such as interactions among the various components of the device components 700, communication with external devices via communication components 704, and storage and retrieval of code and data to and from the memory component 708. Each application includes executable code to provide specific functionality for the processor 706 and/or remainder of the corresponding device. Data is information that may be referenced and/or manipulated by an operating system or application for performing functions of the device.

The device components 700 of each device may further comprise one or more input components 710 and/or one or more output components 712. The input components 710 of the device components 700 may include various types of sensors, such as video input components, audio input components, and mechanical input components. Examples of input components 710 include, but are not limited to, light sensors 714 (consistent with light sensor 104), motion sensors 716, temperatures sensors 718, image sensors 720, and air quality sensors. Likewise, the output components 712 of the device components 700 may include a variety of video, audio and/or mechanical outputs. An example of an output component 712 is, but is not limited to, a light source interface 722 that connects power (such as from power source 734) to a corresponding light source 723 to enable the processor 706 to control the light level of or illumination provided by the light source 723 consistent with the embodiments described herein. In one embodiment, the light source 723 may be included as an output component 712 of the lighting device 700 such that the processor 706 may control the light source 723 directly via interconnection or data bus 702. Also, each device may include a user interface 724 having a specific subset of input components 710 and/or output components 712 for interaction with an operator or installer of the device.

For some embodiments, one of the devices may operate as the energy manager 102 for controlling the other devices of the determined environment. To operate as the energy manager 102, the memory component 708 of the device may include applications or code to support the one or more lighting modes of the building automation system 100. For example, as shown in FIG. 7, the memory component 708 may include applications or code to support the average lighting mode 726, the maximum lighting mode 728, the minimum lighting mode 730, and/or the master lighting mode 832 of the building automation system 100. In this manner, the devices may communicate with a master device or gateway 108, 110 that performs the group determinations, such as the group light level. For other embodiments, the devices may determine the group light level jointly instead of designating a central entity, such as the energy manager 102, gateway 108, 110, or a master device.

The device components 700 may further comprise a power source 734, such as a power supply or a portable battery or an interface to mains power of the building where the lighting device having the components 700 is disposed. The power source 734 may provide power to the other device components 700 of each lighting device of the building management system 100 and provide power to a lighting source 106 via the light source interface 722 as controlled by the processor 706.

Figure 8:
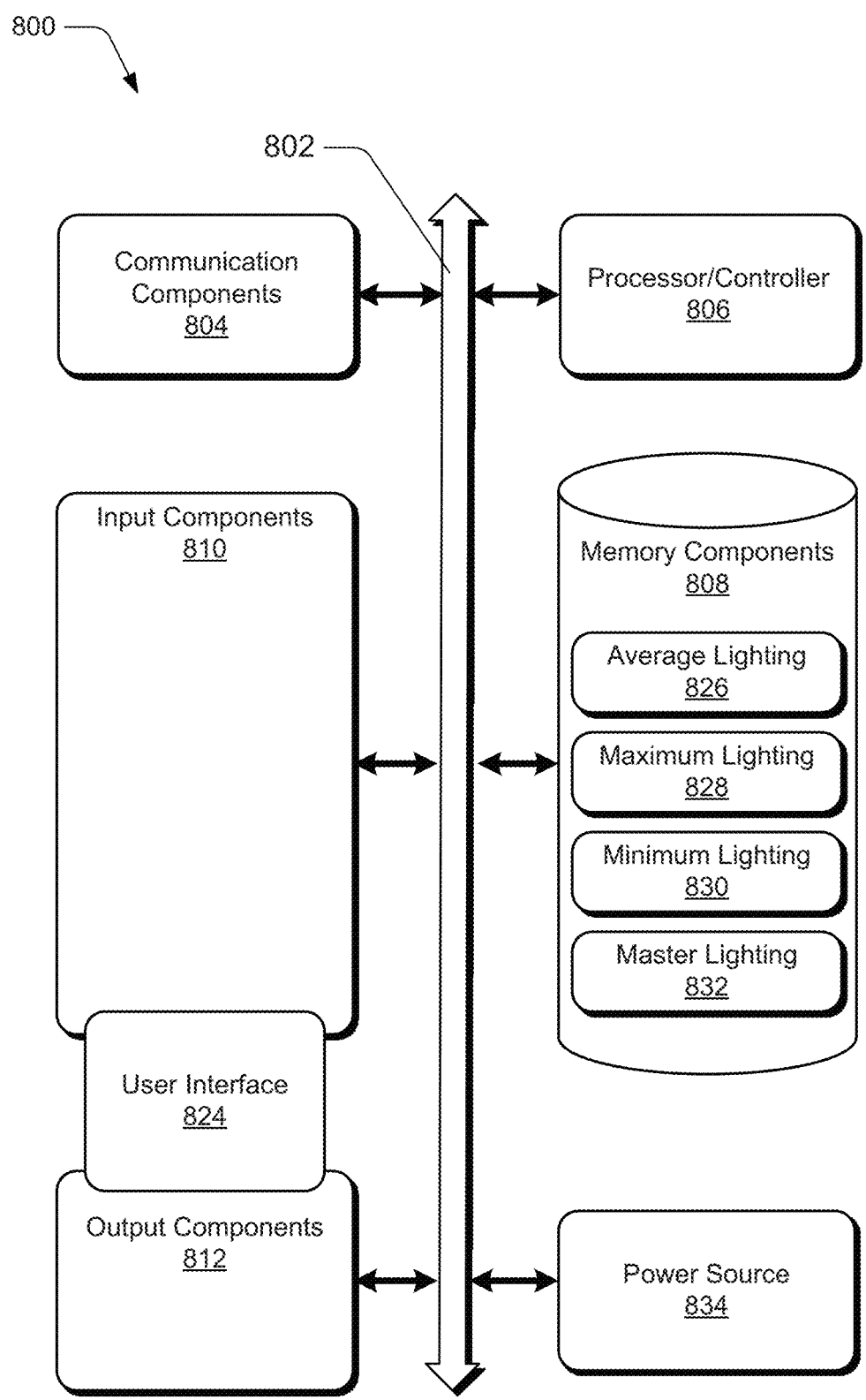
FIG. 8 is a block diagram illustrating example components of an energy manager in accordance with example embodiments of the present invention.

FIG. 8 is a block diagram illustrating example components 800 of an energy manager 102 capable of operating in conjunction with the devices and, if utilized, one or more gateways 108, 110. The device components 800 comprise component interconnections 802 (such as a data bus), a communication component 804, one or more processors or controllers 806, and one or more memory components 808. The communication component 704 of the example device components 800 may utilize wireless and wired technologies for communication, similar to the device components 700 of the devices. The processor 806 may execute code and process data received other components of the device components 800, such as information received at the communication component 804 or stored at the memory component 808. The information stored by the memory component 808 of the energy manager 102 is similar to the information stored by the memory component 708 of the devices. For example, the memory component 808 of the energy manager 102 may include applications or code to support the one or more lighting modes of the building automation system 100. As shown in FIG. 8, the memory component 808 may include applications or code to support the average lighting mode 826, the maximum lighting mode 828, the minimum lighting mode 830, and/or the master lighting mode 832 of the building automation system 100.

Other device components 800 of the energy manager 102 shown in FIG. 8 are similar to the device components 708 of the devices shown in FIG. 7. The device components 800 of the energy manager 102 may comprise one or more input components 810 and/or one or more output components 812. The device components of the energy manager 102 may include a user interface 824 having a specific subset of input components 810 and/or output components 812 for interaction with an operator or installer of the device. The device components 800 may further comprise a power source 834, such as a power supply or a portable battery, for providing power to the other device components 800 of each device of the building management system 100.

It is to be understood that FIGS. 7 and 8 are provided for illustrative purposes only and for illustrating device components 700, 800 of a device. FIGS. 7 and 8 not intended to be complete diagrams of the various components that may be utilized by the device. Therefore, device may include various other components not shown in FIGS. 7 and 8, may include a combination of two or more components, or a division of a particular component into two or more separate components, and still be within the scope of the present invention.

Further, the lighting modes described above are not restricted to the average lighting mode, the maximum lighting mode, the minimum lighting mode, and the master lighting mode of the building automation system 100. Other modes may include selection of multiple master devices, median light levels, percentile light levels (e.g., top 25%), filtering outliers, current occupancy, and weighted averages based on area or occupancy. Modes may also include learning from previous daylight readings at different times and adjusting light accordingly. Modes may have different determinations for indoor vs. outdoor settings. Modes may also read color, such as RGB, and similarly output different colors based on exterior readings. For example, certain modes may mimic outside daylight or to mimic daylight at a remote location, such as greenhouses as well as various locations where employees may travel or work remotely. The target light level may be determined automatically based on space type, ambient readings over time, or occupant preferences. Group light levels may also be set based on polling occupant preferences and differently by time of day or calendar.

Figure 9:
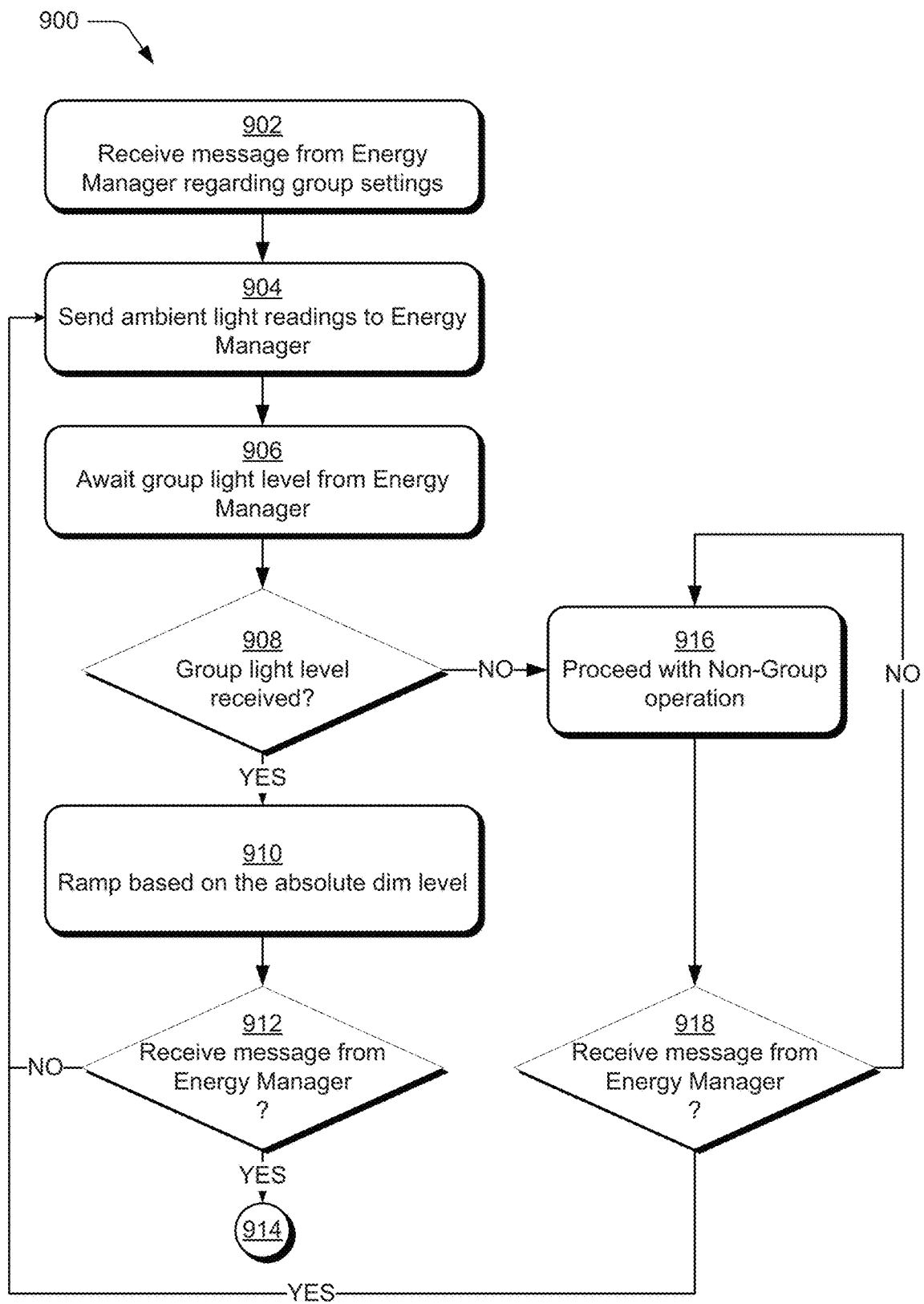
FIG. 9 is a flow diagram illustrating an example operation of the lighting device in accordance with example embodiments of the present invention.

FIG. 9 is a flow diagram illustrating an example operation 900 of the devices, such as a reporting device that includes a light sensor, an acting device that controls or includes a light source, and a reporting and acting device that includes a light sensor and controls or includes a light source. Initially, the device receives an indication from the energy manager to begin the example operation 900, such as a message from the energy manager regarding group settings, as represented by step 902. When a light sensor belongs to a daylight group, the group behavior may override most of the daylight harvesting settings associated with a profile of an individual light sensor or device. Once the device receives such an indication, the light sensor of the device may detect ambient light levels and send the ambient light levels to the energy manager on a periodic basis, as represented by step 904. In addition to the ambient light levels, the device may send a daylight harvesting target light level for consideration by the energy manager. While providing the ambient light levels on a periodic basis, as well as the target light level, the device may await a response from the energy manager as represented by step 906.

In response to providing this information to the energy manager the device may eventually receive a group light level from the energy manager as represented by step 908. The group light level may be determined by the energy manager based on the periodic ambient light levels and the target light level provided by the device. If the group light level is received by the device from the energy manager then the device may adjust illumination uniformly at a light source of the device, if necessary, based on the group light level, as represented by step 910. For example, the light source may ramp-up or ramp-down illumination emanated by the light source gradually so that occupants near the device are less likely to notice the adjustment. Also, the illumination may be adjusted uniformly to a target light level for all light sources.

During the time period when the device is providing information to the energy manager awaiting the group light level from the energy manager, and adjusting illumination (steps 904-910), the device may receive a message from the energy manager indicating a change to the group settings, as represented by step 912. If a message associated with group settings is not received from the energy manager then the device continues with the operation at step 904. In response to receiving the message from the energy manager the device may proceed in one of a variety of ways, as represented by step 914. For example, the device may simply continue providing information, awaiting the group light level, and adjusting illumination by continuing to step 904 of the operation 900. The device may proceed without any changes, or the device may change one or more aspects of its operation such as updating the target light level and/or altering the manner in which ambient light levels are obtained or processed. For another example, the device may termination the operation 900.

Referring back to step 908, the device might not receive a group light level from the energy manager within a predetermined time period. For this situation, the device may proceed with a non-group operation where a light source of the device may maintain or adjust illumination independent of the other devices of the group, as represented by step 916. For the non-group operation, the device may manage illumination based on its own sensors and/or instructions and data stored at the device. The device may continue with the non-group operation if the device does not hear from the energy manager as represented by the loop between steps 916 and 918. If the device receives eventually a message associated with group settings from the energy manager the device may return to the group operation as represented by the operation line extending from step 918 to step 904.

Figure 10:
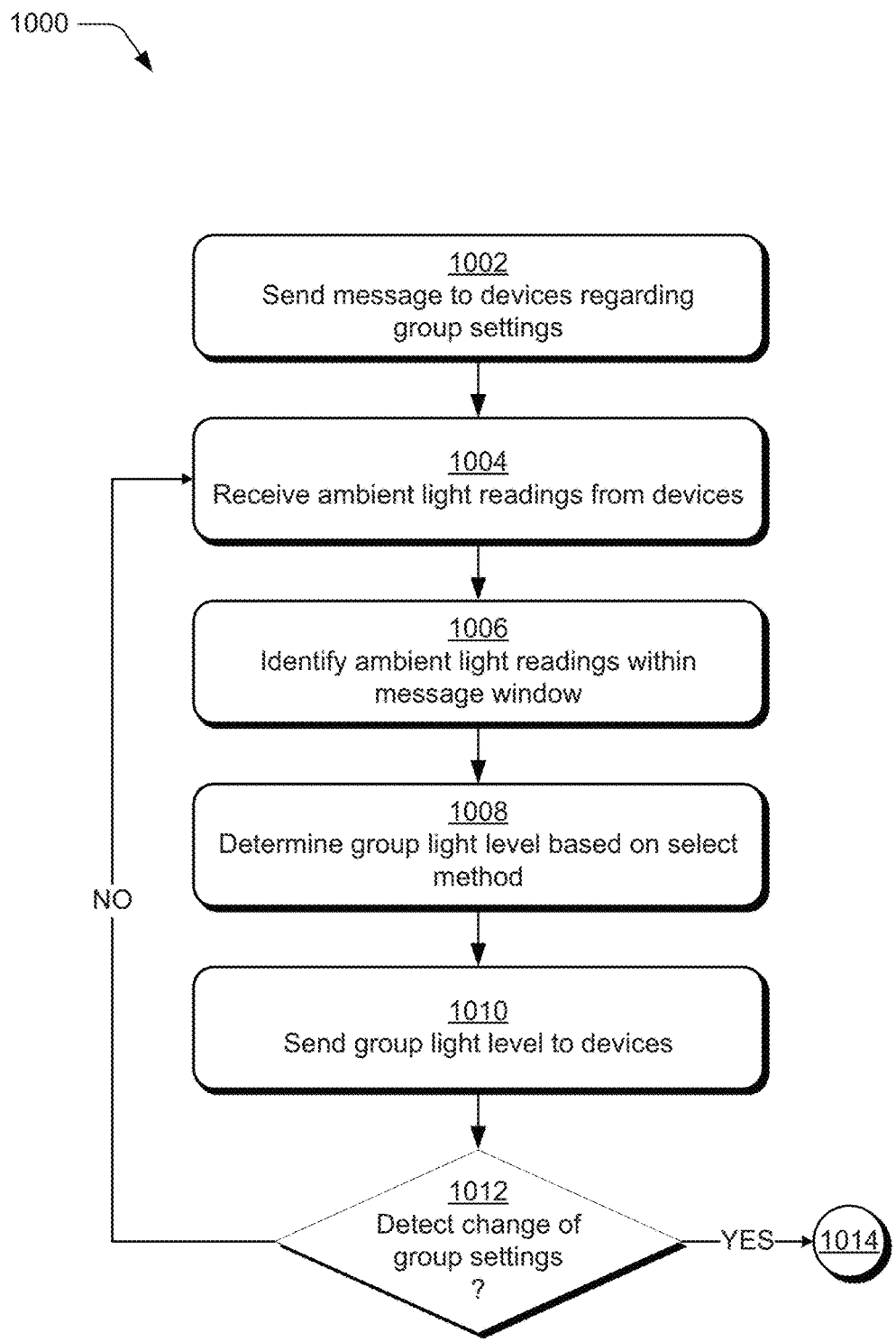
FIG. 10 is a flow diagram illustrating an example operation of the energy manager in accordance with example embodiments of the present invention.

FIG. 10 is a flow diagram illustrating an example operation 1000 of the energy manager Initially, the energy manager may send an indication to begin the operation 1000, such as a message to the devices regarding the group settings, as represented by step 1002. As a result of sending the indication, the energy manager may receive ambient light levels, as well as a daylight harvesting target light levels, from the devices based on the ambient light levels detected by the light sensors of the devices, as represented by step 1004. Subsequent to receiving the ambient light levels, the energy manager may identify light levels within a message window, as represented by step 1006. In particular, the energy manager may distinguish ambient light levels within a message window from ambient light levels outside of the message window.

Subsequent to receiving the ambient light levels and identifying the ambient light levels within the message window, the energy manager may determine a group light level based on the received ambient light levels, as represented by step 1008. For this step, the energy manager may determine the group light level based on ambient light levels within the message window. The energy manager may determine the group light level based on a lighting mode, as described above. Examples of the lighting mode includes, but are not limited to, an average lighting mode, a minimum lighting mode, a maximum lighting mode, or a master lighting mode. Thereafter, the energy manager may transmit the determined group light level to the devices, so that the light sources of the devices may adjust illumination uniformly based on the group light level, as represented by step 1010. Throughout the steps of receiving the ambient light levels, checking the message window, and determining and sending the group light level (1004-1010), the energy manager may detect a change of group settings, as represented by step 1012. For example, the change of group settings may occur as a result of user input at the user interface of the energy manager If a change of group settings is not detected by the energy manager then the energy manager may continue the steps of receiving the ambient light levels, checking the message window, and determining and sending the group light level (1004-1010) until a change is detected. If a change of group settings is detected, then the energy manager may proceed in one of a variety of ways, as represented by step 1014. For example, the device may continue with steps 1004-1010 without any changes, continue with steps 1004-1010 with one or more changes to its operation, or terminate the operation 1000.

Figure 11:
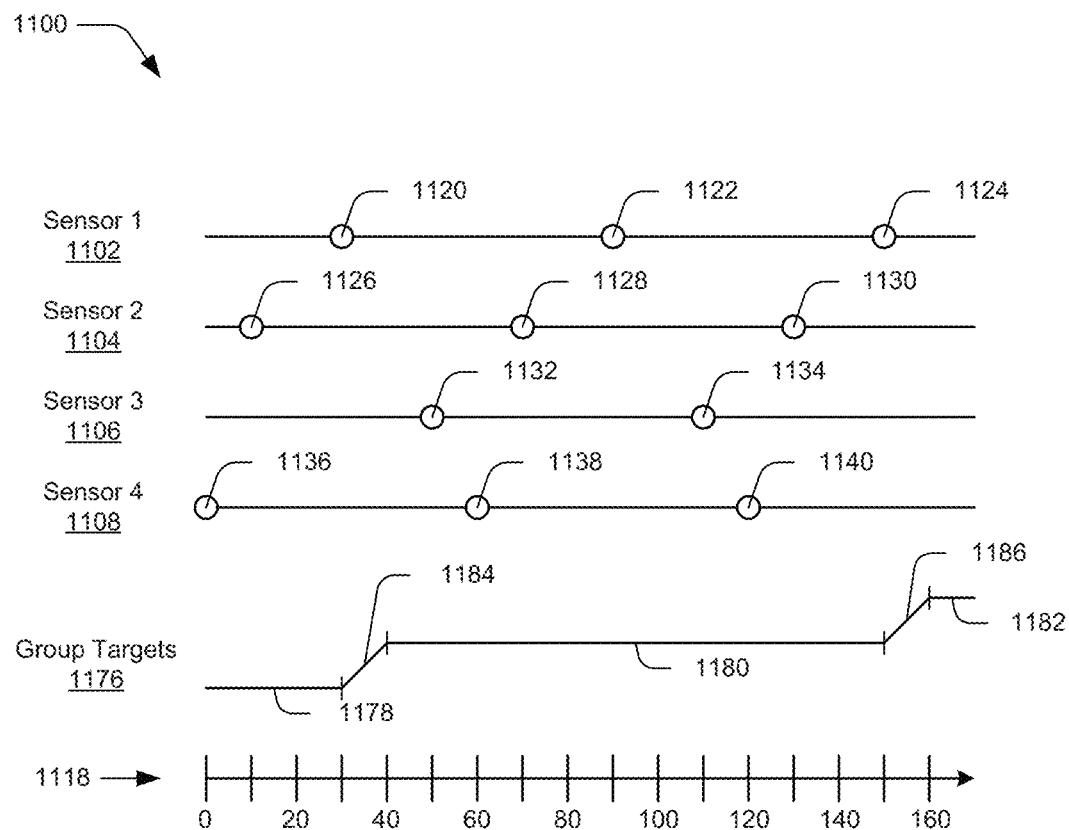
FIG. 11 is a timing diagram illustrating an example of coordinated operations of multiple lighting devices and an energy manager in accordance with example embodiments of the present invention.
Figure 11:
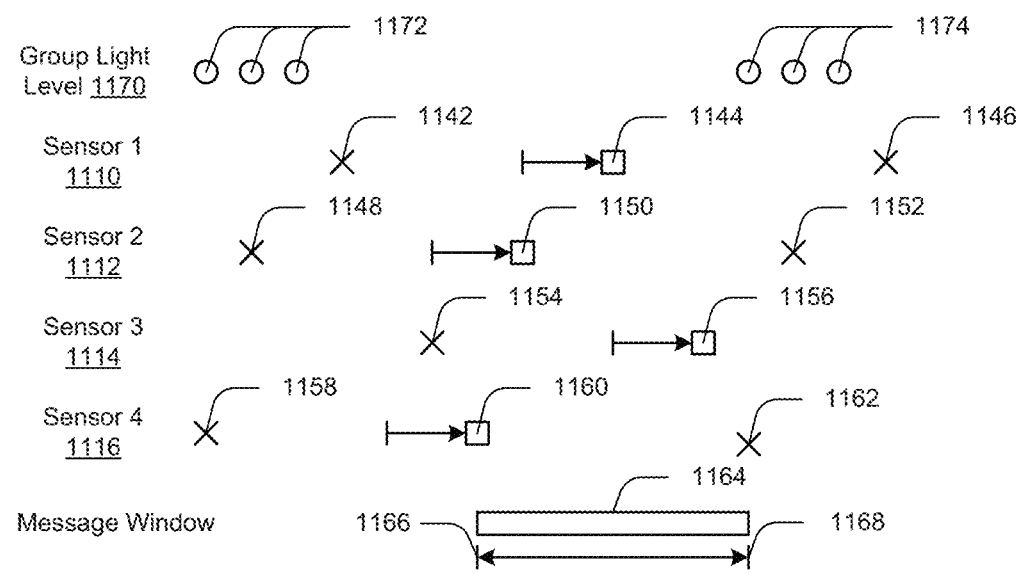

FIG. 11 is a timing diagram illustrating an example operation 1100 of coordinated operations of multiple light sensors of the devices and an energy manager. The upper part of the timing diagram represents operations of the devices, including the light sensors and the light sources, and the lower part of the timing diagram represents the operations of the energy manager. For this example operation 1100, the output signals 1102-1108 of the light sensors is represented at the upper part of the timing diagram, the input signals 1110-1116 of the light sensors is represented at the lower part of the timing diagram, and a timeline 1118 specifying time in seconds is represented at the middle of the timing diagram. Timing diagram also includes representations of a message window 1164-1168, output signals 1170-1174 of the energy manager, and group targets 1176-1186 of the light sources.

The output signals 1102-1108 of the light sensors are represented at the upper part of the timing diagram. For the example operation 1100, each light sensor transmits an ambient light level every 60 seconds. For example, as shown in FIG. 11 based on the timeline 1118, the sensor 1 signals 1102 are transmitted at 30, 90, and 150 seconds 1120, 1122, 1124; the sensor 2 signals 1104 are transmitted at 10, 70, and 130 seconds 1126, 1128, 1130; the sensor 3 signals (1106) are transmitted at 50 and 110 seconds 1132, 1134; and the sensor 4 signals (1108) are transmitted at 0, 60, and 120 seconds 1136, 1138, 1140. Thus, the light sensors may transmit the ambient light levels at different times, but each light sensor transmits at consistent time intervals.

The input signals 1110-1116 of the light sensors are represented at the lower part of the timing diagram. For the example operation 1100, the energy manager receives an ambient light level every 60 seconds, consistent with the output signals 1102-1108 of the light sensors. The transmission time delay between sending and receiving the ambient light levels is not shown in FIG. 11 for simplicity in order to emphasize other aspects of the timing diagram. Based on the timeline 1118, the energy manager receives the sensor 1 signals 1110 at 30, 90, and 150 seconds 1142, 1144, 1146; the energy manager receives the sensor 2 signals 1112 at 10, 70, and 130 seconds 1148, 1150, 1152; the energy manager receives the sensor 3 signals 1114 at 50 and 110 seconds 1154, 1156; and the energy manager receives the sensor 4 signals 1116 at 0, 60, and 120 seconds 1158, 1160, 1162. Thus, the energy manager may receive the ambient light levels at different times, but each ambient light level is received at consistent time intervals.

The output signals 1170-1174 of the energy manager are represented at the lower part of the timing diagram, just below the timeline 1118. The energy manager determines a group light level 1170 and transmits the output signals 1172, 1174 associated with the group light level one or more times over a short time period. For the example operation 1100, the energy manager transmits the output signal 1172 multiple times over ten second intervals at 1, 10, and 20 seconds and the output signal 1174 multiple times over ten second intervals at 120, 130, and 140 seconds based on the timeline 1118.

The group targets 1176-1186 of the light sources are represented at the upper part of the timing diagram, just above the timeline 1118. The light sources, and/or their associated devices, receive the output signals 1172, 1174 from the energy manager and adjust (i.e., increase, decrease, or no change) illumination of the respective light source for the determined environment gradually based on the input signals. For example, the example operation 1100 illustrates the group targets as having a first stable period 1178 from time 0 seconds through time 30 seconds, a second stable period 1180 from time 40 seconds to time 150 seconds, and third stable period 1182 starting at time 160 seconds. Thus, for this example, the group targets increase gradually over a ten second period, namely at a first change period 1184 from time 30 seconds to time 40 seconds, in response to output signal 1172 provided by the energy manager. Likewise, the group targets increase gradually over a ten second period, namely a second change period 1186 from time 150 seconds to time 160 seconds, in response to output signal 1174 provided by the energy manager.

Timing diagram also includes representations of a message window 1164, starting at a first message time 1166 and ending at a second message time 1168. The message window 1164 represents a time period when messages or signals may be used reliably for determination of the group light level. The message window 1164 is determined based on the stable periods of the group targets 1176. For example, the message window of the example operation 1100 has a first message time 1166 and a second message time 1168 that is within the endpoints of the second stable period 1180 of the group targets 1176. Messages or signals received within the message window during the stable period are considered to be reliable for determination of the group light level. Signals of the input signals 1110-1116 that fall into this window, namely signals 1144, 1150, 1156, and 1160, so they may be used to the determination. It should be noted that each of these signals within the message window have a duration period extending prior to the signal time. For example, the first message window signal 1144 has a duration period of 70 seconds to 90 seconds, the second message window signal 1150 has a duration period of 50 seconds to 70 seconds, the third message window signal 1156 has a duration period of 90 seconds to 110 seconds, and the fourth message window signal 1160 has a duration period of 40 seconds to 60 seconds. The energy manager refers to that duration period, so that all ramping is complete for the signals used for the determination.

Those skilled in the art will recognize that, for simplicity and clarity, the full structure and operation of all data processing systems suitable for use with the present disclosure are not being depicted or described herein. Also, none of the various features or processes described herein should be considered essential to any or all embodiments, except as described herein. Various features may be omitted or duplicated in various embodiments. Various processes described may be omitted, repeated, performed sequentially, concurrently, or in a different order. Various features and processes described herein can be combined in still other embodiments as may be described in the claims.

It is important to note that while the disclosure includes a description in the context of a fully functional system, those skilled in the art will appreciate that at least portions of the mechanism of the present disclosure are capable of being distributed in the form of instructions contained within a machine-usable, computer-usable, or computer-readable medium in any of a variety of forms, and that the present disclosure applies equally regardless of the particular type of instruction or signal bearing medium or storage medium utilized to actually carry out the distribution. Examples of machine usable/readable or computer usable/readable mediums include: nonvolatile, hard-coded type mediums such as read only memories (ROMs) or erasable, electrically programmable read only memories (EEPROMs), and user-recordable type mediums such as floppy disks, hard disk drives and compact disk read only memories (CD-ROMs) or digital versatile disks (DVDs).

Although an example embodiment of the present disclosure has been described in detail, those skilled in the art will understand that various changes, substitutions, variations, and improvements disclosed herein may be made without departing from the spirit and scope of the disclosure in its broadest form.

The invention claimed is:

1. A building automation system for controlling illumination uniformly based on ambient light comprising:
   a plurality of light sensors distributed within an environment, the plurality of light sensors detecting a plurality of ambient light levels of the environment;
   an energy manager receiving the plurality of ambient light levels from the plurality of light sensors and determining a group light level based on the plurality of ambient light levels, wherein the energy manager identifies a plurality of message window signals corresponding to the plurality of ambient light levels within a message window represented by a time period in seconds and determines the group light level based on ambient light levels within the message window, wherein the message window is determined based on stable periods of group targets; and
   a plurality of light sources distributed within the environment, the plurality of light sources providing illumination uniformly based on the group light level by setting light levels of at least some of the plurality of light sources to be brighter or less bright than their individual targets and, on average, the light levels of the plurality of light sources meet the group light level.

2. The building automation system as described in claim 1, wherein the plurality of light sources adjust the illumination to a target light level.

3. The building automation system as described in claim 1, wherein the energy manager determines the group light level based on a mode selected from a group consisting of an average lighting mode, a maximum lighting mode, a minimum lighting mode, or a master lighting mode.

4. The building automation system as described in claim 1, further comprising the energy manager determines the group light level based on a plurality of target light levels of the plurality of light sensors and the ambient light levels.

5. The building automation system as described in claim 1, further comprising:
   a remote reporting device transmitting a first communication to the energy manager, wherein the remote reporting device includes a communication component, a controller, and at least one light sensor of the plurality of light sensors; and
   a remote acting device receiving a second communication from the energy manager, wherein the remote acting device includes a communication component, a controller, and at least one light source of the plurality of light sources.

6. The building automation system as described in claim 1, further comprising a remote reporting and acting device transmitting and receiving communications to and from the energy manager, wherein the remote reporting and acting device includes a communication component, a controller, at least one light sensor of the plurality of light sensors, and at least one light source of the plurality of light sources.

7. The building automation system as described in claim 1, wherein the light levels are set to be brighter or less bright than their individual targets to supplement available daylight.

8. A method of a building automation system for controlling illumination uniformly based on ambient light, the method comprising:
   detecting a plurality of ambient light levels at a plurality of light sensors;
   determining a group light level at an energy manager based on the plurality of ambient light levels, wherein determining the group light level includes:
      identifying a plurality of message window signals corresponding to the plurality of ambient light levels within a message window represented by a time period in seconds, wherein the message window is determined based on stable periods of group targets; and
      determining the group light level based on ambient light levels within the message window; and
   adjusting illumination uniformly at a plurality of light sources based on the group light level by setting light levels of at least some of the plurality of light sources to be brighter or less bright than their individual targets and, on average, the light levels of the plurality of light sources meet the group light level.

9. The method as described in claim 8, wherein adjusting the illumination uniformly at the plurality of light sources includes adjusting the illumination to a target light level for all light sources of the plurality of light sources.

10. The method as described in claim 8, wherein determining the group light level includes determining the group light level based on a mode selected from a group consisting of an average lighting mode, a minimum lighting mode, a maximum lighting mode, or a master lighting mode.

11. The method as described in claim 8, wherein determining the group light level includes determining the group light level based on a plurality of target light levels of the plurality of light sensors and the plurality of ambient light levels.

12. The method as described in claim 8, further comprising:
   receiving the plurality of ambient light levels at the energy manager from the plurality of light sensors; and
   transmitting the group light level to the plurality of light sources from the energy manager.

13. The method as described in claim 8, wherein adjusting the illumination uniformly at the plurality of light sources based on the group light level includes gradually ramping the illumination at the plurality of light sources.

14. The method as described in claim 8, wherein setting the light levels to be brighter or less bright than their individual targets includes setting the light levels to supplement available daylight.

* * * * *